US011034445B2

United States Patent
Woodworth et al.

(10) Patent No.: US 11,034,445 B2
(45) Date of Patent: Jun. 15, 2021

(54) WING STRUCTURE AND ATTACHMENT TO FRAME FOR UNMANNED AERIAL VEHICLES

(71) Applicant: Wing Aviation LLC, Mountain View, CA (US)

(72) Inventors: Adam Woodworth, San Jose, CA (US); Adem Rudin, Mountain View, CA (US); Stephen Benson, San Carlos, CA (US)

(73) Assignee: Wing Aviation LLC, Mountain View, CA (US)

(*) Notice: Subject to any disclaimer, the term of this patent is extended or adjusted under 35 U.S.C. 154(b) by 141 days.

(21) Appl. No.: 15/823,129

(22) Filed: Nov. 27, 2017

(65) Prior Publication Data

US 2019/0161185 A1    May 30, 2019

(51) Int. Cl.
*B64C 39/02* (2006.01)
*B64C 1/06* (2006.01)
(Continued)

(52) U.S. Cl.
CPC ............ *B64C 39/024* (2013.01); *B64C 1/061* (2013.01); *B64C 3/185* (2013.01); *B64C 3/26* (2013.01);
(Continued)

(58) Field of Classification Search
CPC ........... B64C 1/061; B64C 3/32; B64C 27/08; B64C 27/22; B64C 27/26; B64C 39/024
See application file for complete search history.

(56) References Cited

U.S. PATENT DOCUMENTS 1,425,555 A * 8/1922 Thompson ............ B64C 23/005
                                                        244/6
2,157,045 A * 5/1939 Wiese ...................... B64B 1/00
                                                        244/25
(Continued)

FOREIGN PATENT DOCUMENTS

CA        2 963 502 A1    10/2018
CN        104554704 A      4/2015
(Continued)

OTHER PUBLICATIONS

E-Turbine 250 LED FPV Racing Drone (ARF), Retrieved from Internet: <https://hobbyking.com/en_us/e-turbine-led-fpv-250-quadracer.html> on Oct. 5, 2017, 6 pages.
(Continued)

*Primary Examiner* — Michael H Wang
(74) *Attorney, Agent, or Firm* — Christensen O'Connor Johnson Kindness PLLC

(57) ABSTRACT

Systems for wing structure and attachment to frame for Unmanned Autonomous Vehicle (UAV) are disclosed herein. In one embodiment, a UAV includes an H-frame having a wing spar secured to two or more boom carriers. The wing spar includes two or more mounting locations, where each of the two or more mounting locations of the wing spar secures a horizontal propulsion unit. The boom carriers include a plurality of mounting locations, each of the plurality of mounting locations of the boom carriers securing a vertical propulsion unit. The UAV also includes a preformed wing shell attached to the H-frame.

21 Claims, 10 Drawing Sheets

(51) Int. Cl.
  *B64C 3/18* (2006.01)
  *B64C 3/26* (2006.01)
  *B64C 27/22* (2006.01)

(52) U.S. Cl.
  CPC ........ *B64C 27/22* (2013.01); *B64C 2201/021* (2013.01); *B64C 2201/027* (2013.01); *B64C 2201/104* (2013.01); *B64C 2201/108* (2013.01); *B64C 2201/165* (2013.01); *B64C 2211/00* (2013.01)

(56) References Cited

U.S. PATENT DOCUMENTS

| | | | |
|---|---|---|---|
| 2,273,919 A | | 2/1942 | Allward |
| 2,511,504 A | * | 6/1950 | Hawkins ................. B64C 21/02 244/208 |
| 2,994,493 A | | 8/1961 | Hartman |
| 3,219,123 A | * | 11/1965 | Stocker ................... B29C 70/30 416/230 |
| 3,856,238 A | * | 12/1974 | Malvestuto, Jr. ......... B64B 1/00 244/5 |
| 4,979,698 A | * | 12/1990 | Lederman ........... B64C 29/0033 244/17.13 |
| 6,293,491 B1 | * | 9/2001 | Wobben ................. B64C 27/00 244/17.23 |
| 6,843,447 B2 | * | 1/2005 | Morgan ............. B64C 29/0025 244/12.3 |
| 7,159,817 B2 | * | 1/2007 | VanderMey ........ B64C 29/0016 244/12.1 |
| 7,237,750 B2 | | 7/2007 | Chiu et al. |
| 8,152,096 B2 | | 4/2012 | Smith |
| 8,256,715 B2 | | 9/2012 | Ballard et al. |
| 8,393,564 B2 | * | 3/2013 | Kroo ......................... B64C 3/56 244/6 |
| 8,925,870 B1 | | 1/2015 | Gordon et al. |
| 9,045,226 B2 | | 6/2015 | Piasecki et al. |
| 9,120,560 B1 | * | 9/2015 | Armer ................. B64C 29/0008 |
| 9,205,922 B1 | * | 12/2015 | Bouwer ................... B64D 9/00 |
| 9,242,738 B2 | * | 1/2016 | Kroo ......................... B64C 3/16 |
| 9,522,725 B2 | | 12/2016 | Torre |
| 9,586,683 B1 | * | 3/2017 | Buchmueller ........ B64C 39/024 |
| 9,623,969 B2 | | 4/2017 | Nelson |
| 9,688,400 B2 | * | 6/2017 | Hutson ................. B64C 39/024 |
| 9,988,985 B2 | | 6/2018 | Amarasinghe et al. |
| 10,053,213 B1 | * | 8/2018 | Tu ....................... B64C 29/0025 |
| 10,351,235 B2 | * | 7/2019 | Karem ..................... B64C 39/12 |
| 10,364,036 B2 | * | 7/2019 | Tighe ....................... B64D 29/02 |
| 10,479,496 B2 | * | 11/2019 | Gamble ................... H02K 7/14 |
| 2003/0062443 A1 | * | 4/2003 | Wagner ..................... B64C 3/56 244/12.3 |
| 2003/0085319 A1 | * | 5/2003 | Wagner ..................... B64C 3/56 244/12.3 |
| 2008/0210809 A1 | | 9/2008 | Arlton et al. |
| 2010/0123042 A1 | | 5/2010 | Ballard et al. |
| 2010/0163669 A1 | | 7/2010 | Im |
| 2011/0315806 A1 | * | 12/2011 | Piasecki ................. G05D 1/102 244/2 |
| 2012/0056041 A1 | * | 3/2012 | Rhee ....................... B64C 25/32 244/4 R |
| 2013/0092799 A1 | * | 4/2013 | Tian ....................... B64C 27/26 244/7 R |
| 2014/0061376 A1 | * | 3/2014 | Fisher .................... B64D 27/24 244/62 |
| 2014/0131510 A1 | * | 5/2014 | Wang .................... B64C 39/024 244/17.23 |
| 2014/0263823 A1 | * | 9/2014 | Wang .................... B64C 39/028 244/17.23 |
| 2015/0298800 A1 | * | 10/2015 | Yoon ........................ B60F 5/02 244/2 |
| 2016/0129998 A1 | * | 5/2016 | Welsh ................... B64C 39/024 244/12.3 |
| 2016/0130000 A1 | * | 5/2016 | Rimanelli ............. B64C 39/024 244/2 |
| 2016/0207625 A1 | * | 7/2016 | Judas .................. B64C 29/0025 |
| 2016/0236774 A1 | * | 8/2016 | Niedzballa .............. B64C 27/30 |
| 2016/0297520 A1 | | 10/2016 | Sada-Salinas et al. |
| 2016/0347447 A1 | * | 12/2016 | Judas .................. B64C 29/0025 |
| 2017/0106978 A1 | * | 4/2017 | Sopper ..................... B65D 5/18 |
| 2017/0210486 A1 | * | 7/2017 | O'Brien ................. B64C 1/062 |
| 2017/0217562 A1 | * | 8/2017 | Schalla ..................... B64C 1/34 |
| 2017/0225779 A1 | * | 8/2017 | Gamble ............. B64C 29/0025 |
| 2017/0300065 A1 | * | 10/2017 | Douglas ............... G05D 1/0676 |
| 2018/0079483 A1 | | 3/2018 | Ivans et al. |
| 2018/0273158 A1 | | 9/2018 | Courtin |
| 2019/0084684 A1 | * | 3/2019 | Eller ...................... B64D 27/24 |
| 2019/0161153 A1 | | 5/2019 | Woodworth et al. |

FOREIGN PATENT DOCUMENTS

| | | |
|---|---|---|
| CN | 106081098 A | 11/2016 |
| DE | 20 2014 004 877 U1 | 7/2014 |
| EP | 3 162 705 A1 | 5/2017 |
| GB | 2120621 A | 12/1983 |
| GB | 2505942 A | 3/2014 |
| WO | 2016/193512 A1 | 12/2016 |
| WO | 2017/066748 A1 | 4/2017 |

OTHER PUBLICATIONS

International Search Report and Written Opinion from the International Searching Authority dated Feb. 28, 2019 for International Application No. PCT/US2018/062453, filed Nov. 26, 2018, 20 pages.
Non-Final Office Action dated Nov. 29, 2019, in U.S. Appl. No. 15/823,114, filed Nov. 27, 2017, 13 pages.
Chris Hofmann, Wing Assembly, Oct. 31, 2013, screenshot of YouTube video <https://www.youtube.com/watch?v=2zuy8Hg9p34&list=TLPQMTkxMTIwMTmGDB5Wjl9lAQ&index=2>, 1 pages.
TheRcSaylors, RISE Vusion 250 Race Drone Crash & Repair, Dec. 22, 2016, screenshot of YouTube video <https://www.youtube.com/watch?v=f9fmnWTopF8>, 3 pages.
Zoukei-mura, Horten Ho-229 Super Wing Series 1/48 No. 3 manual, Aug. 2015, <https://www.zoukeimura.co.jp/en/products/sws48_03_ho229.html>, 3 pages.
European Office Action dated Jul. 7, 2020 for corresponding European Patent Application No. 18816432.1-1010, 3 pages.
Australian Examination Report, dated Dec. 21, 2020, in corresponding Australian Patent Application No. 2018372208, 4 pages.
Singapore Search Report, dated Nov. 27, 2020, in corresponding Singapore Patent Application No. 11202003249U, 10 pages.

* cited by examiner

CROSS SECTION 5-5

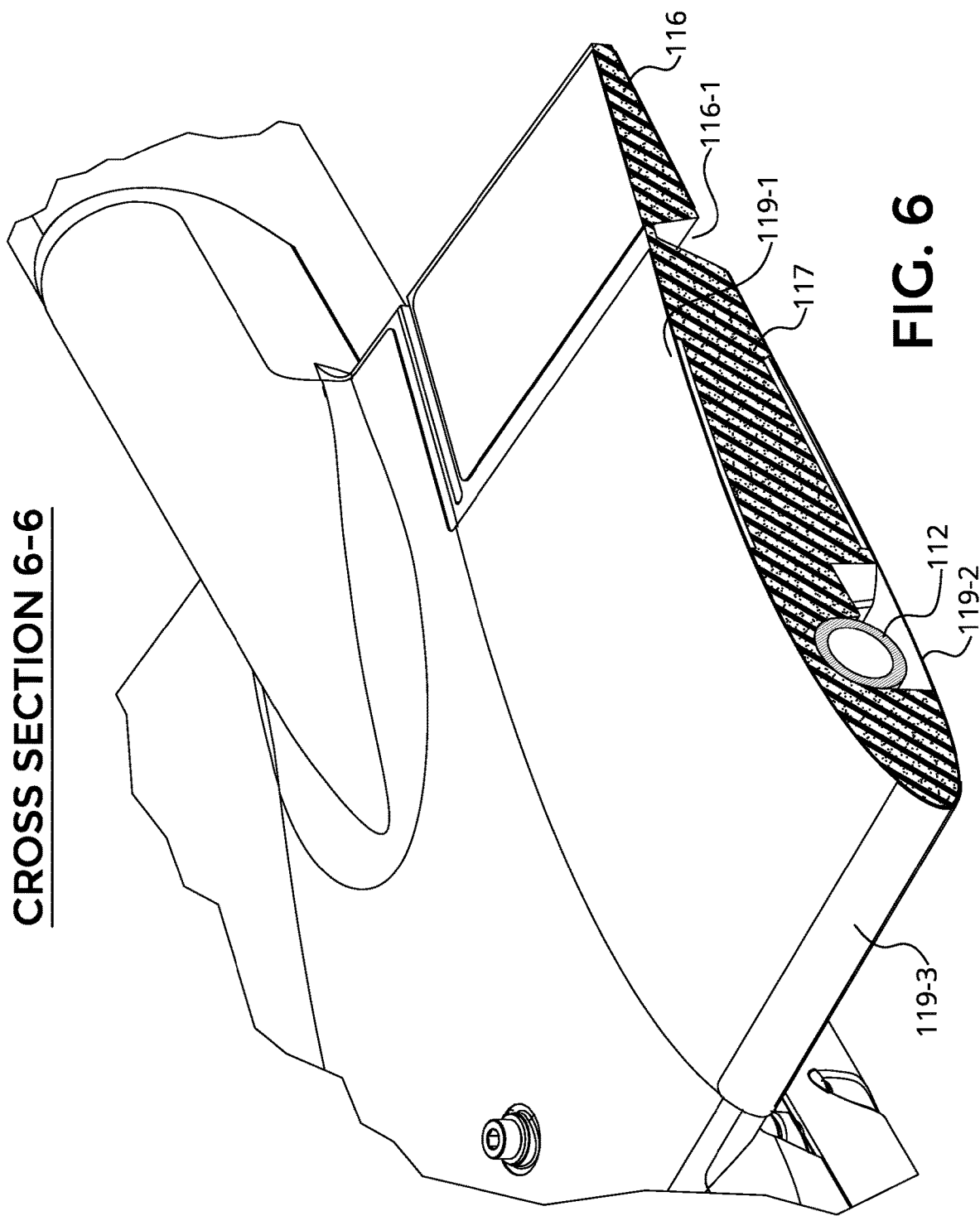

CROSS SECTION 7-7

WING STRUCTURE AND ATTACHMENT TO FRAME FOR UNMANNED AERIAL VEHICLES

CROSS REFERENCE TO RELATED APPLICATIONS

The present application is related to a U.S. application entitled "Assembly Systems and Methods for Unmanned Aerial Vehicles," filed on the same day U.S. application Ser. No. 15/823,114 filed Nov. 27, 2017.

BACKGROUND

An unmanned vehicle, which may also be referred to as an autonomous vehicle, is a vehicle capable of travel without a physically-present human operator on board. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle by commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

Various types of unmanned vehicles exist for different environments. For instance, unmanned vehicles may operate in the air, on the ground, underwater, or in space. Examples include quad-copters and tail-sitter unmanned aerial vehicles (UAVs), among others. Some unmanned vehicles operate in multi-environment operation. Examples of such hybrid unmanned vehicles include an amphibious craft that is capable of operation on land as well as on water, or a floatplane that is capable of landing on water as well as on land. Other examples are also possible.

Some conventional UAVs include an inner structural frame and an outer shell. The structural frame is built using a relatively strong, but also relatively heavy material (e.g., steel, aluminum, hard plastic, etc.), while the outer shell is made of a lighter filler material (e.g., closed cell foam or other light polymer). Typically, the structural frame is surrounded by the outer shell material.

With some conventional technologies, the structural frame is assembled or manufactured first. Next, the outer shell (e.g., closed cell foam) is sprayed onto the frame to give a shape to the UAV. The excess outer shell material is cut away to make room for cables, engines, avionics, and other subassemblies. However, in some cases removing the excess outer shell material may be difficult and time consuming, thus decreasing the efficiency of the overall UAV manufacturing process.

Furthermore, the material of the frame and the material of the outer shell may have different coefficients of thermal expansion (CTE). As a result, the frame and the outer shell expand and contract at different rates as the temperature of the environment changes causing manufacturing and assembly defects. In time, different expansion rates may lead to bending of the frame, and, for a sufficiently high number of the temperature cycles, to material fatigue and fracturing of the frame.

Accordingly, there remains a need for the systems and methods for assembling UAVs having improved efficiency of the assembly and reduced stress on the structural frame.

DESCRIPTION OF THE DRAWINGS

The foregoing aspects and many of the attendant advantages of inventive technology will become more readily appreciated as the same become better understood by reference to the following detailed description, when taken in conjunction with the accompanying drawings, wherein:

FIG. 6 is a cross-sectional view 6-6 of the UAV shown in FIG. 4;

DETAILED DESCRIPTION

While illustrative embodiments have been described, it will be appreciated that various changes can be made therein without departing from the spirit and scope of the inventive technology. Briefly, the inventive technology is directed to assembling and testing UAVs. In some embodiments, a wing spar and a boom carrier are assembled to form a structural H-frame. The wing spar and the boom carrier may be tubes made of, for example, carbon fiber, hard plastic, aluminum, or metal alloys. The wing spar and the boom carrier may have pre-drilled holes for the subsequent attachment of motor mounts.

In some embodiments, a wing shell and boom shells may be attached to the H-frame by adhesive elements (e.g., adhesive tape, double-sided adhesive tape, glue, etc.). Therefore, multiple shells are attached to the H-frame instead of having a monolithic body sprayed onto the H-frame as in the prior art. In some embodiments, the presence of the multiple shells reduces the CTE-induced stresses of the structural frame of the UAV. As a result, the UAV may have better dimensional accuracy and/or improved reliability.

Furthermore, in at least some embodiments, the same H-frame may be used with the wing shell and/or boom shells having different size and/or design, therefore improving the modularity and versatility of the UAV designs. Moreover, a fuselage of the UAV may also be modular/interchangeable. The wing shell and/or the boom shells may be made of relatively light polymers (e.g., closed cell foam) covered by the harder, but relatively thin, plastic skins.

In some embodiments of the inventive technology, UAV subsystems may be tested before the assembly of the UAV is completed. For example, components of the fuselage (e.g., avionics, battery unit, delivery units) may be electrically tested before the fuselage is mounted to the H-frame. Furthermore, the motors and the electronics of printed circuit boards (PCBs) may also be electrically tested before the final assembly. Generally, the identification of the defective parts and subassemblies early in the assembly process lowers the overall cost and lead time of the UAV.

Figure 1:
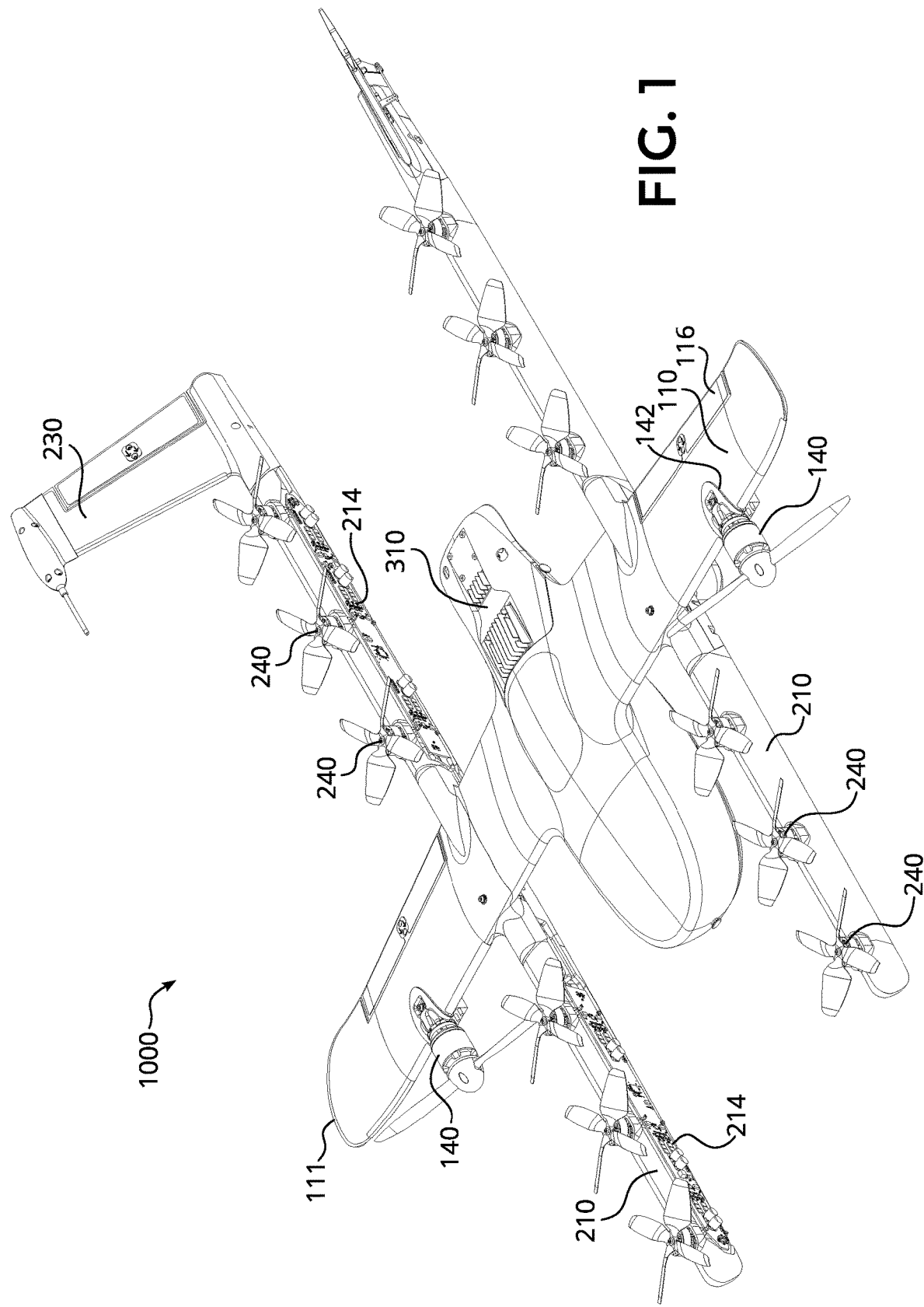
FIG. 1 is an isometric view of a UAV in accordance with an embodiment of the present technology.

FIG. 1 is an isometric view of a UAV 1000 in accordance with an embodiment of the present technology. The UAV 1000 includes a wing 110, booms 210, and a fuselage 310. In some embodiments, the wing 110 carries horizontal propulsion units 140, and the booms 210 carry vertical propulsion units 240. In operation, power for the propulsion units may be provided from a battery compartment 310-1 of the fuselage 310. In some embodiments, the fuselage 310 also includes an avionics compartment 310-1, an additional battery compartment (not shown) and/or a delivery unit 310-2 for handling the payload.

In some embodiments, the booms 210 terminate in rudders 230 for improved yaw control of the UAV 1000. The wings 110 may terminate in wing tips 111 for improved control of lift of the UAV.

The illustrated UAV 1000 includes a structural frame. Some embodiments of the structural frame are discussed with reference to FIG. 2 below.

Figure 2:
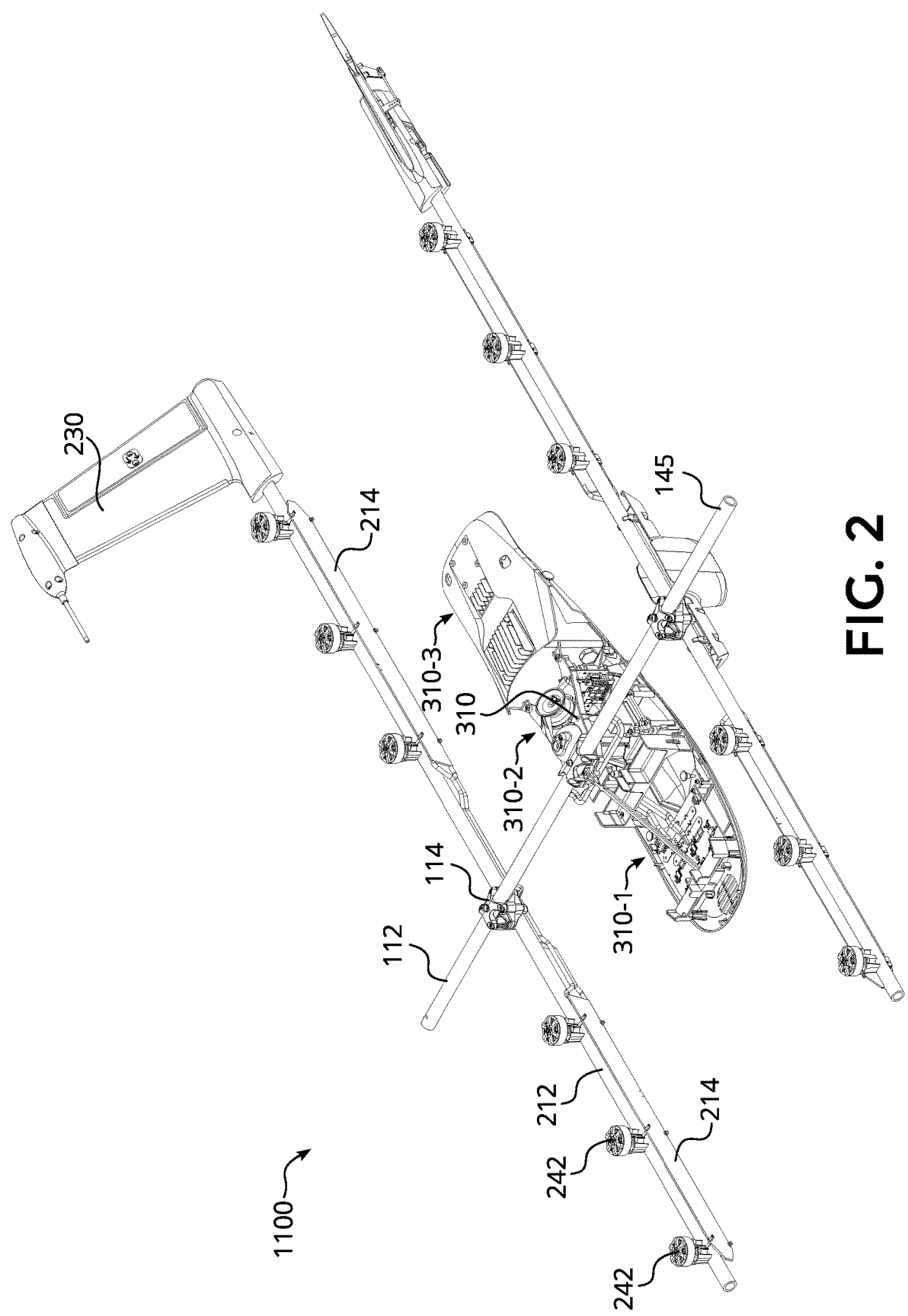
FIG. 2 is an isometric view of a frame of a UAV in accordance with an embodiment of the present technology.

FIG. 2 is an isometric view of a structural frame 1100 (also referred to as a "structural H-frame" or an "H-frame") of a UAV in accordance with an embodiment of the present technology. The H-frame 1100 includes a wing spar 112 and boom carriers 212. In some embodiments the wing spar 112 and the boom carriers 212 may be made of carbon fiber, hard plastic, aluminum, light metal alloys, or other materials. The wing spar 112 and the boom carriers 212 may be connected with clamps 114. The wing spar 112 may include predrilled holes 145 for horizontal propulsion units, and the boom carriers 212 may include predrilled holes (hidden by motor mounts 242 in this view) for vertical propulsion units.

In some embodiments, the fuselage 310 is removeably attached to the H-frame (e.g., attached to the wing spar 112 by clamps 114). The removable attachment of the fuselage 310 may improve quality and/or modularity of the UAV. For example, electrical/mechanical components of the fuselage 310 may be tested before attaching the fuselage 310 to the H-frame and/or before attaching PCBs 214 to the boom carriers 212, therefore eliminating defective parts/subassemblies prior to completing the UAV. Furthermore, different types/models of the fuselage 310 may be attached to the H-frame, therefore improving the modularity of the design. The electrical cabling and routing of the PCBs is discussed with reference to FIG. 3 below.

Figure 3:
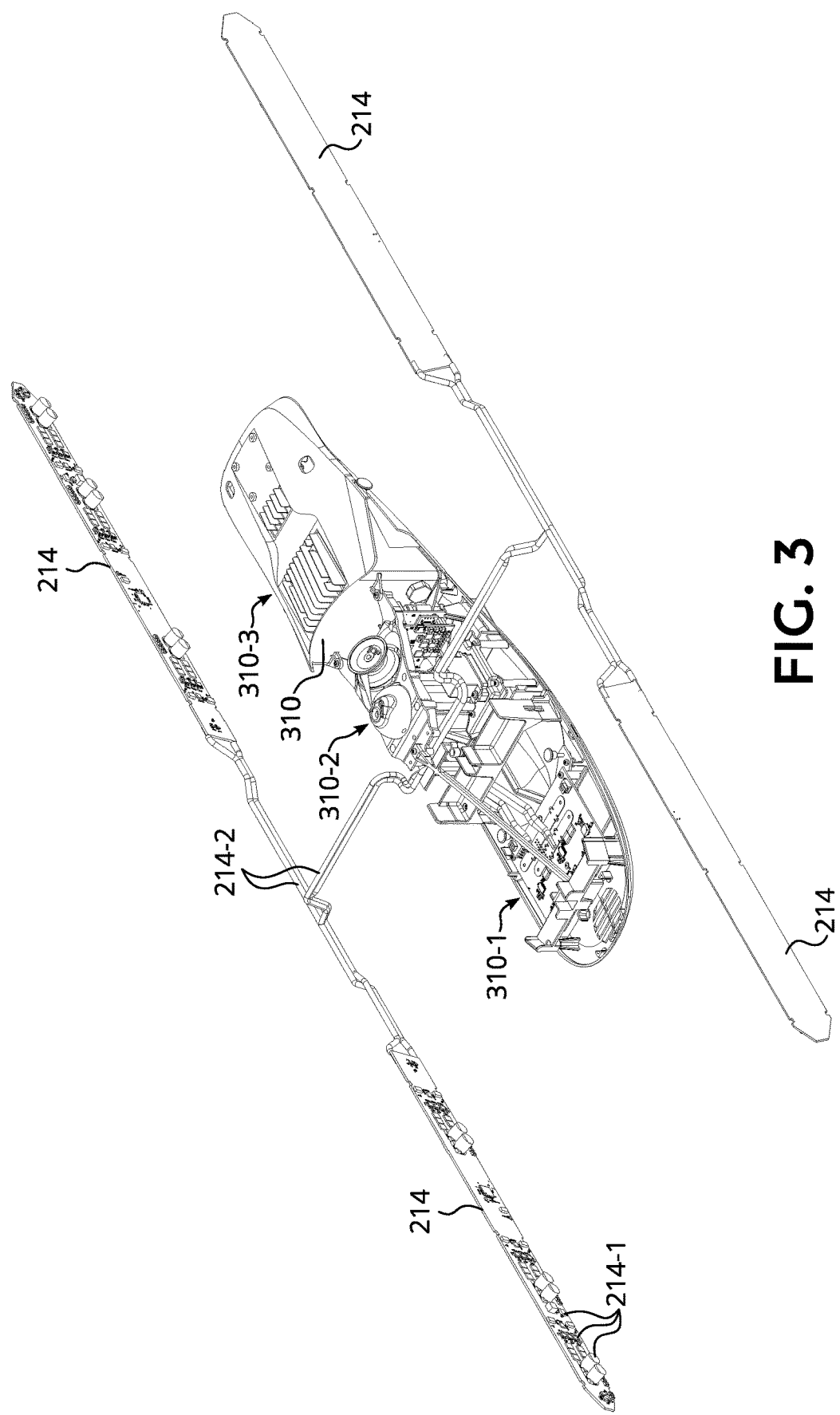
FIG. 3 is an isometric view of cable routing of a UAV in accordance with an embodiment of the present technology.

FIG. 3 is an isometric view of cable routing of a UAV in accordance with an embodiment of the present technology. The power and/or control signals from the fuselage 310 may be routed through cables 214-2 to PCBs 214. In the illustrated embodiment, the UAV has four PCBs, but other numbers of PCBs are also possible. For example, the UAV may include two PCBs, one per the boom. The PCBs carry electronic components 214-1, for example, power converters, controllers, memory, passive components, etc. In operation, the propulsion units of the UAV are electrically connected to the PCBs.

Figure 4:
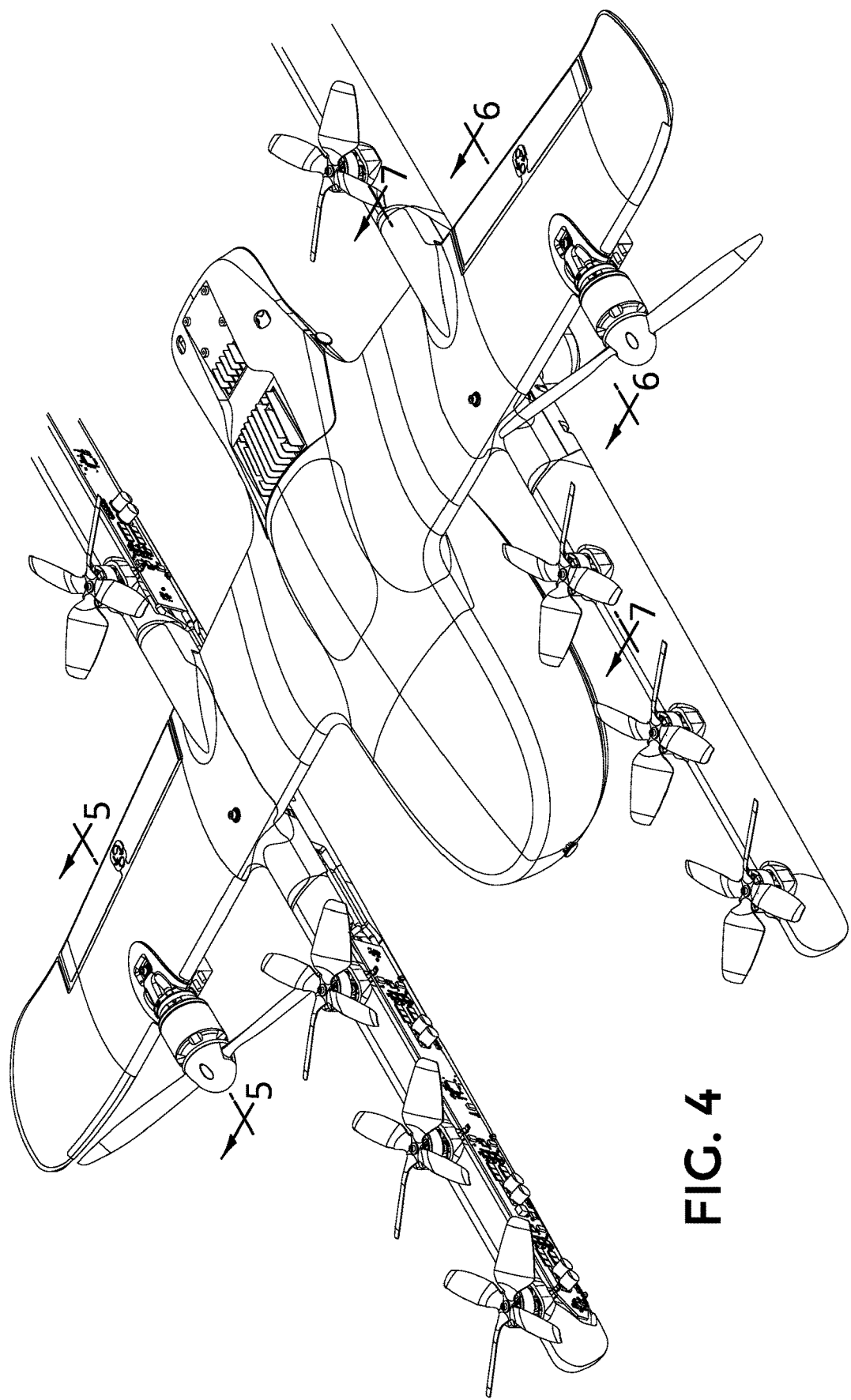
FIG. 4 is a partial isometric view of a UAV in accordance with an embodiment of the present technology.

FIG. 4 is a partial isometric view of a UAV in accordance with an embodiment of the present technology. FIG. 4 includes cross-sections 5-5, 6-6, and 7-7. The individual cross-sections are discussed with reference to FIGS. 5-7 below.

Figure 5:
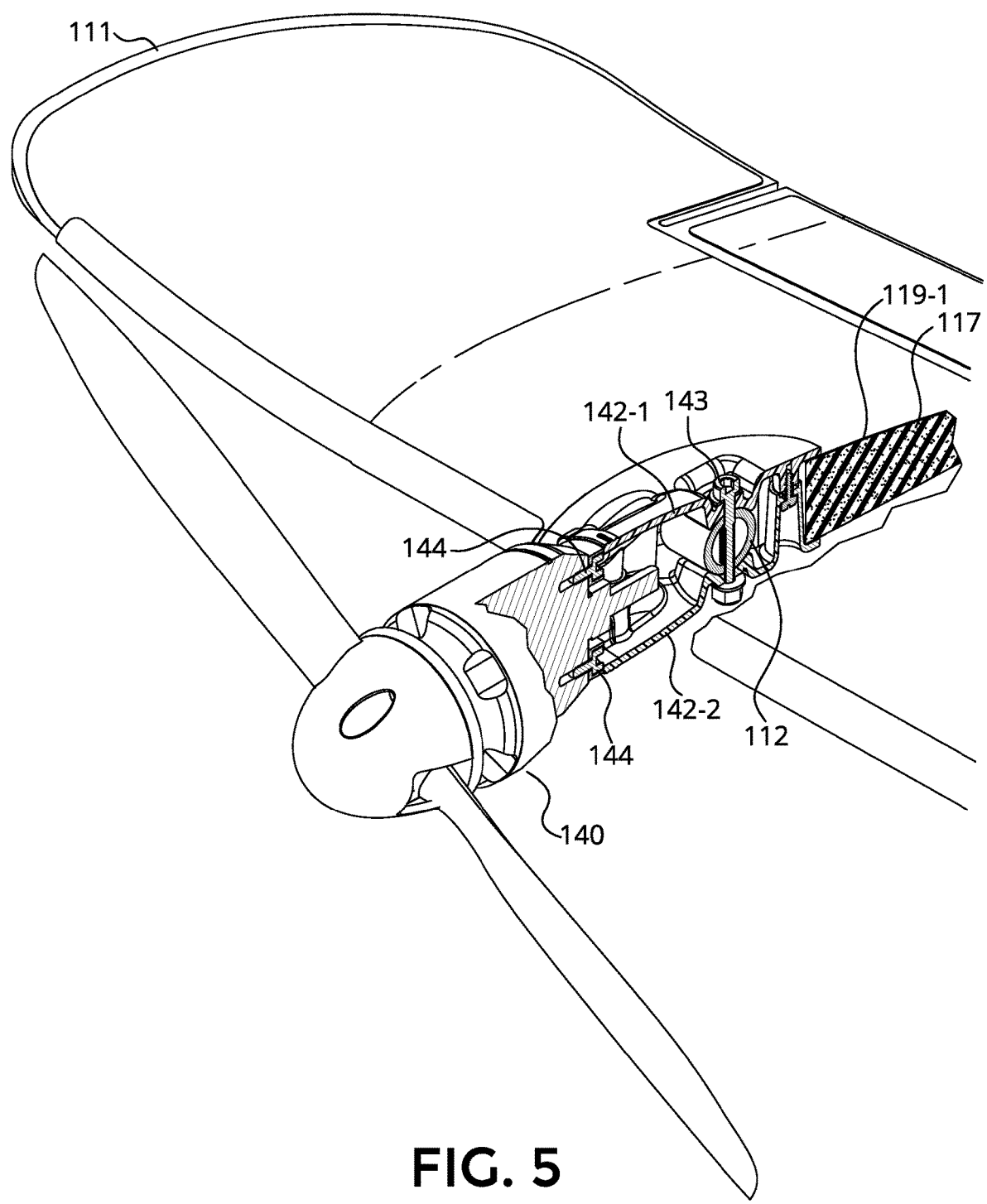
FIG. 5 is a cross-sectional view 5-5 of the UAV shown in FIG. 4.

FIG. 5 is a cross-sectional view 5-5 of the UAV shown in FIG. 4. In some embodiments, motor mounts 142 include a two-part C-clamp having an upper segment 142-1 and a lower segment 142-2. In other embodiments, the motor mounts 142 may include different types of clamps. The two segments of the motor mount 142 may be attached to the wing spar by a fastener 143, for example, a nut and bolt combination. In some embodiments, the wing spar 112 includes pre-drilled holes for the fasteners 143.

The horizontal propulsion unit 140 may be attached to the motor mount 142 by fasteners 144. In some embodiments, replacement of the propulsion unit is facilitated by relatively easy removal of the fasteners 144. Furthermore, the same motor mounts 142 may be suitable for different types of the horizontal propulsion units 140, thus facilitating the modularity of the UAV.

Figure 5A:
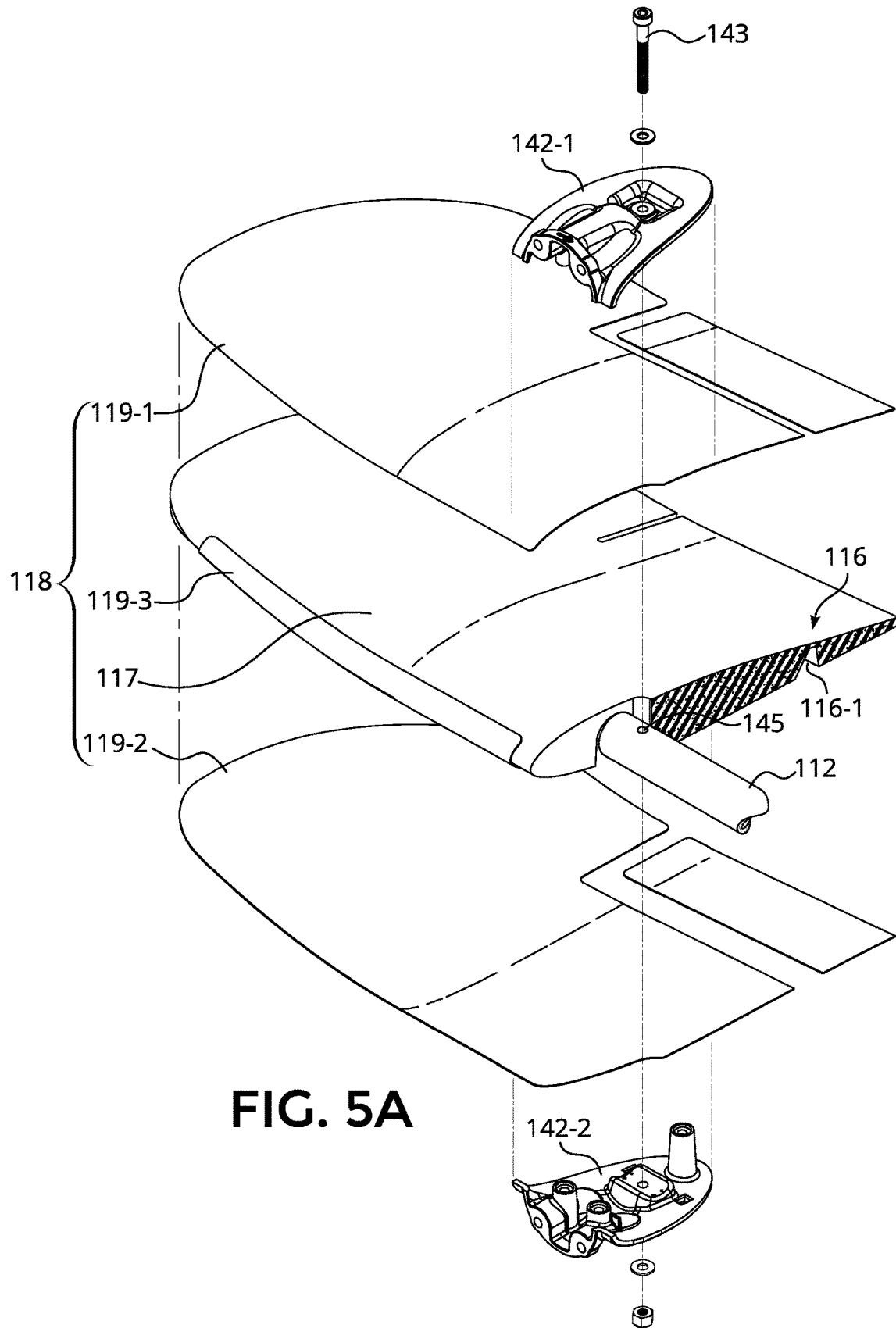
FIG. 5A is an exploded cross-sectional view 5-5 of the UAV shown in FIG. 4.

FIG. 5A is an exploded cross-sectional view 5-5 of the UAV shown in FIG. 4. During the assembly, the segments 142-1 and 142-2 of the motor mounts 140 may be slid over the wing skins 119-1 and 119-2; aligned with the hole 145 in the wing spar 112; and then tightened with the fastener 143 through the wing spar and clamped over the wing skins. In some embodiments, the wing skins 119-1 and 119-2 may be made of hard plastic to prevent or at least minimize compression of a wing body 117, which may be made of closed cell foam or other light and relatively soft polymer.

The upper and lower wing skins 119-1/119-2 may be connected with a wing skin clip 119-3 (e.g., structural tape, hard plastic element, metal clip, etc.). In some embodiments, connecting the wing skins into a unitary structure improves structural integrity (e.g., a resistance against torsion) of the wing. In other embodiments, forming the upper and lower portions of the wing skin, as well as a connector segment (i.e., in place of wing skin clip 119-3), as a single, unitary structure (not shown) also may improve structural integrity.

In some embodiments, the upper wing skin 119-1 may be pre-assembled with the wing body 117 by, for example, gluing. After assembling the wing shell 118 with the wing spar 112, the horizontal propulsion units may be connected to their corresponding cabling using the space under the wing. Next, the lower wing skin 119-2 may be attached to the wing body 117 by, for example, gluing.

FIG. 6 is a cross-sectional view 6-6 of the UAV shown in FIG. 4. In some embodiments, the wing shell includes an aileron 116 for controlling the roll of the UAV. In some embodiments, the aileron 116 may be formed by weakening the wing body 117 at the trailing edge of the wing. For example, a groove 116-1 may form a flexible connection between the aileron 116 and the rest of the wing body 117.

Figure 7:
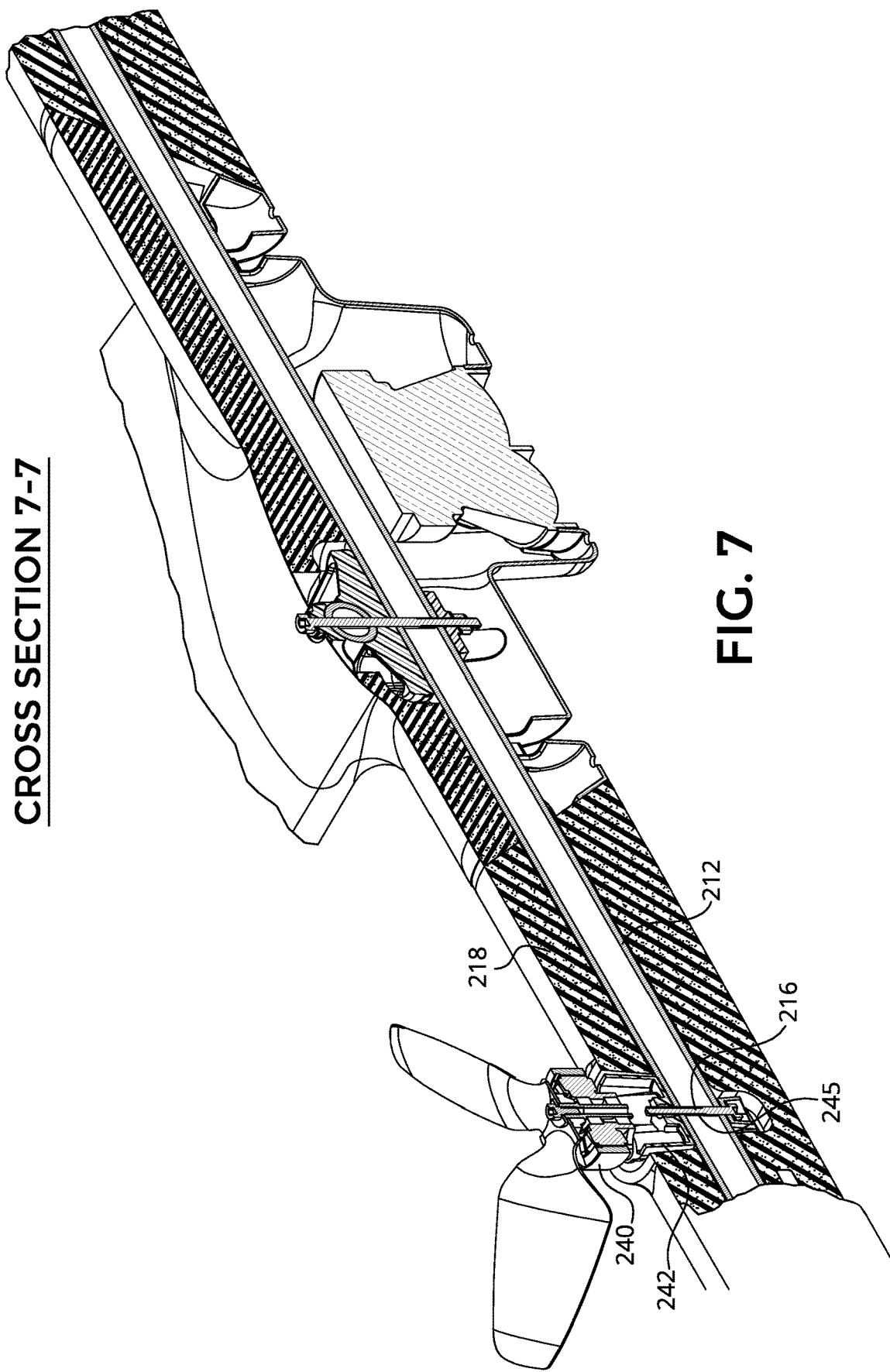
FIG. 7 is a cross-sectional view 7-7 of the UAV shown in FIG. 4.

FIG. 7 is a cross-sectional view 7-7 of the UAV shown in FIG. 4. The plane of the cross-section passes through the axis of the boom carrier 212. The boom carrier 212 may carry several vertical propulsion units 240 along its length. Furthermore, the cables and the PCBs (not shown) also may be added to the boom carrier prior to attaching the boom shell 218 for easier electrical routing and testing of the UAV. In some embodiments, the boom shells 218 may be formed (e.g., molded) using light polymers (e.g., closed cell foam). At the assembly time, the boom shells 218 may be adhesively attached to the boom carrier by adhesive elements, for example, adhesive film, adhesive tape, double-sided adhesive tape, glue, etc.

In some embodiments, the motor mounts 242 are preassembled onto the boom carrier 212 prior to attaching a boom shell 218 to the boom carrier. The vertical propulsion units 240 may be attached to the motor mounts 242 with fasteners 216, for example, the bolt and nut combination. In some embodiments, holes 245 are pre-drilled through the boom carrier 212 for easier assembly.

Figure 8:
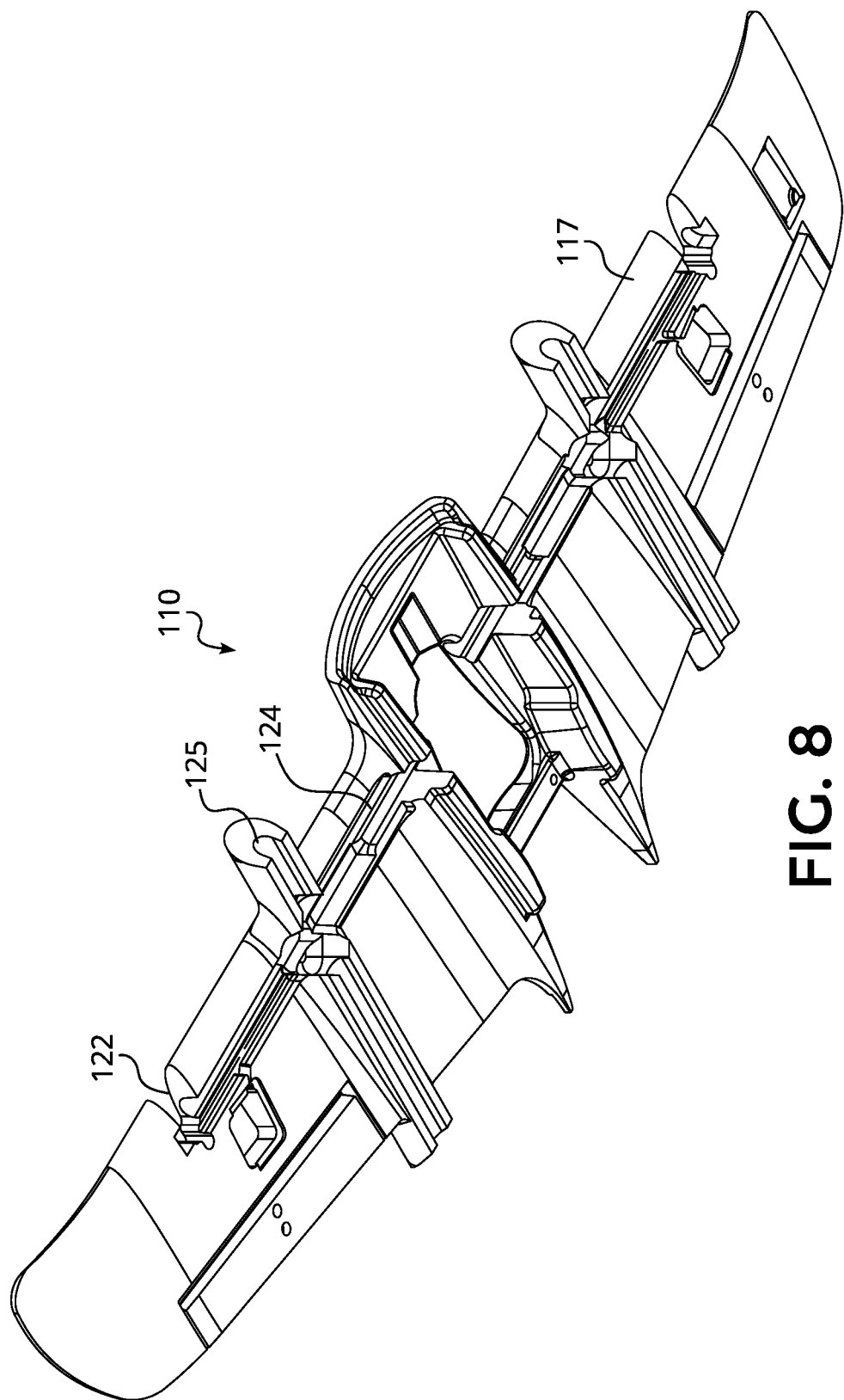
FIG. 8 is an isometric view of a wing in accordance with an embodiment of the present technology.

FIG. 8 is an isometric view of the wing 110 in accordance with an embodiment of the present technology. In some embodiments, the wing 110 is formed (e.g., molded) using light polymers (e.g., closed cell foam). The pre-made wing 110 may include several grooves and/or opening that eliminate or at least reduce the need to cut out the portions of the wing at the assembly time for, for example, cable routing, PCB attachment, motor mount attachment, fit with the H-frame, etc. For example, the wing 110 may include grooves 124 for mating with the wing spar 112 and grooves 125 for mating with the boom carriers 212. Furthermore, the wing 110 may include notches 122 for the motor mount for the horizontal propulsion units to enable self-fixturing during assembly. As a result, in at least some embodiments, attachment of the components and routing of the cables of the UAV requires less time and effort. In some embodiments, the pre-made wings 110 having differing shapes and/or sizes may be used over the same H-frame.

Figure 9:
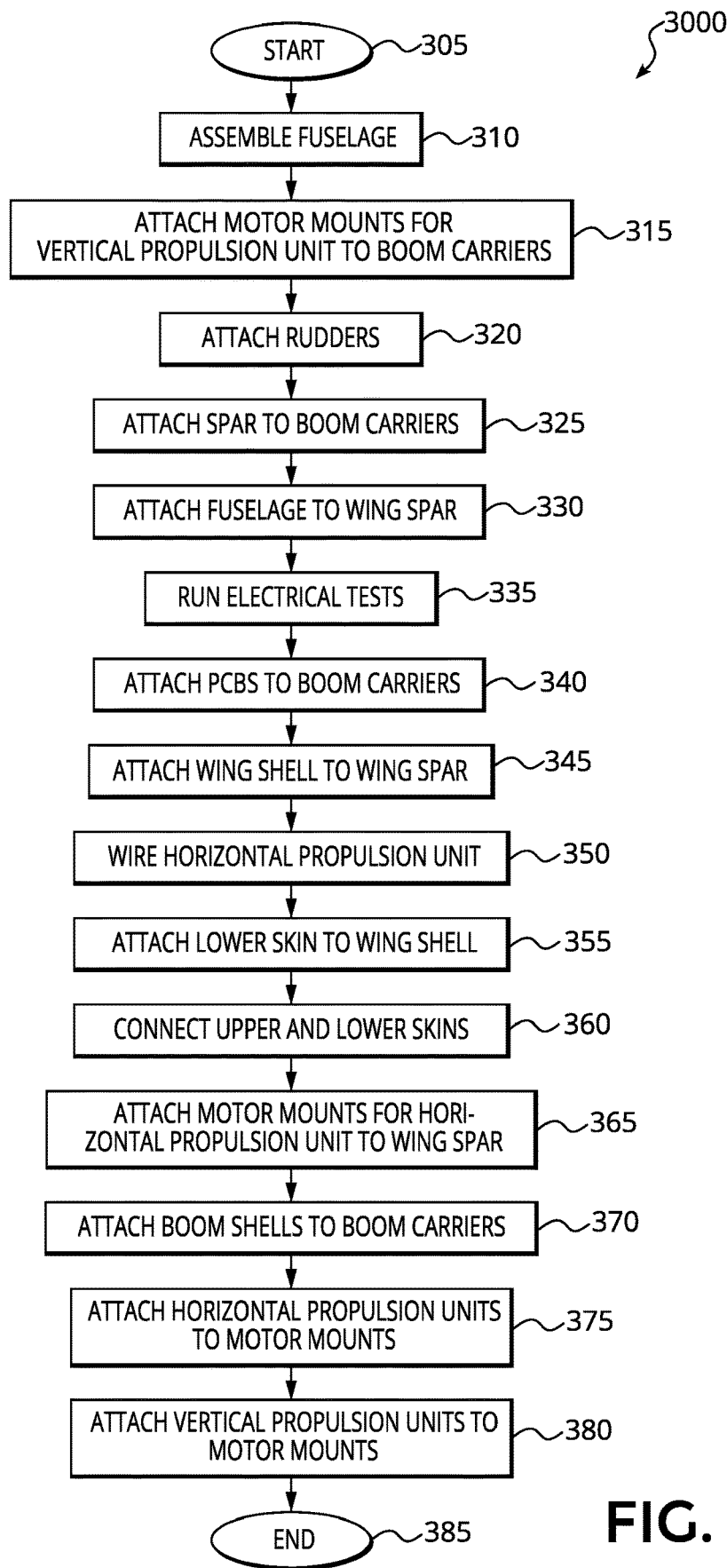
FIG. 9 is a flow diagram of a method of assembly in accordance with an embodiment of the present technology.

FIG. 9 is a flow diagram of a method of assembly in accordance with an embodiment of the present technology. In some embodiments, the method may include additional steps or may be practiced without all steps illustrated in the flow chart. Furthermore, in some embodiments, the order of the steps listed may be changed.

The method starts in step 305, and continues to step 310. In step 310, the fuselage is assembled. In some embodiments, the fuselage may include compartments, for example, the battery compartment, the avionics compartment, an additional battery compartment and/or the payload compartment. In some embodiments, the fuselage may be electrically/mechanically tested before assembling it with the UAV. In other embodiments, one compartment of the fuselage may be attached to the wing spar first, followed by attaching the remaining compartments to the already-attached compartment and/or to the spar.

In step 315, the motor mounts for the vertical propulsion units are attached to the boom carriers. In some embodiments, the boom carriers may include predrilled holes for attaching the motor mounts.

In step 320, the rudders are attached to the boom carriers. Generally, the rudders improve the yaw control of the UAV.

In step 325, the wing spar and the boom carriers are connected to form the H-frame. In some embodiments, the individual wing spar and/or the individual boom carrier may include several structural elements. For example, the wing spar may comprise several carbon tubes for, for example, improved structural integrity.

In step 330, the fuselage is attached to the wing spar. The size/type of the fuselage may be selected based on, for example, type of the task that the UAV needs to perform. Such a variability of the size/type of the fuselage increases the modularity of the UAV design.

In step 335, the avionics, power supply, cable connections, etc., may be tested. As explained above, the testing of the fuselage may have already been partially or entirely performed in the earlier assembly steps.

In step 340, the PCBs may be attached to the boom carriers. Furthermore, the cables may be routed and dressed throughout the UAV.

In step 345, the wing shell may be attached to the wing spar by, for example, gluing. In some embodiments, the wing shell may already include the pre-assembled upper wing skin.

In step 350, the horizontal propulsion units may be wired. In some embodiments, the horizontal propulsion units may also be tested at this step, before being attached to the wing.

In step 355, the lower wing skin may be attached to the wing shell by, for example, gluing. In many embodiments, the cable routing and dressing, and attaching the PCB to the boom are at least partially completed before this step.

In step 360, the upper and lower skins may be connected by one or more wing skin clips. Generally, the wing skin clips improve the rigidity of the wing shell.

In step 365, the motor mounts for horizontal propulsion units are attached to the wing spar. In some embodiments, a motor mount may be a two-piece C-shell that clamps on the upper and lower skins of the wing shell. In some embodiments, the motor mount is attached with the wing spar with a single fastener.

In step 370, the boom shells are attached to the boom carriers. In some embodiments, by this step most or all of the cabling and PCB attachments has been completed without the boom shells standing in the way.

In step 375, the horizontal propulsion units are attached to motor mounts by, for examples, fasteners. In some embodiments, the horizontal propulsion units may have already been electrically connected and tested.

In step 380, the vertical propulsion units are attached to motor mounts. In some embodiments, the vertical propulsion units may have already been electrically connected and tested. The method ends in step 385.

Many embodiments of the technology described above may take the form of computer-executable or controller-executable instructions, including routines executed by a programmable computer or controller. Those skilled in the relevant art will appreciate that the technology can be practiced on computer/controller systems other than those shown and described above. The technology can be embodied in a special-purpose computer, application specific integrated circuit (ASIC), controller or data processor that is specifically programmed, configured or constructed to perform one or more of the computer-executable instructions described above. Of course, any logic or algorithm described herein can be implemented in software or hardware, or a combination of software and hardware.

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. An Unmanned Autonomous Vehicle (UAV), comprising:
an H-frame having a wing spar secured to boom carriers, wherein the wing spar includes two or more spar mounting locations each configured to secure a horizontal propulsion unit, and wherein each of the boom carriers includes a plurality of boom mounting locations each configured to secure a vertical propulsion unit, wherein each of the boom carriers includes a first one of the boom mounting locations disposed fore of the wing spar and a second one of the boom mounting locations disposed aft of the wing spar;

a pre-formed wing shell attached to the H-frame, wherein the pre-formed wing shell includes a wing body shaped to provide aerodynamic lift and having a first groove and two or more second grooves recessed into an underside of the wing body, wherein the first groove aligns with the wing spar and is shaped to mate with and accept the wing spar into the first groove, wherein the second grooves align with the boom carriers and are shaped to mate with and accept the boom carriers into the second grooves, and wherein the first groove crosses the second grooves where the wing spar is secured to the boom carriers; and pre-formed boom shells each attached to a corresponding one of the boom carriers.

2. The UAV of claim 1, wherein the wing shell further comprises:

an upper wing skin; and a lower wing skin separate from the upper wing skin.

3. The UAV of claim 2, wherein the wing body comprises closed cell foam and the wing skins comprise hard plastic.

4. The UAV of claim 3, wherein a motor mount of a horizontal propulsion unit comprises:

a 2-piece C-shell in contact with the hard plastic of the wing shell, and a fastener protruding through the C-shell and through the wing spar.

5. The UAV of claim 2, further comprising:

a wing skin clip connecting the upper wing skin and the lower wing skin.

6. The UAV of claim 2, wherein the wing body includes wing tips pointing away from the H-frame.

7. The UAV of claim 6, further comprising:

a first plurality of motor mounts, each of the first plurality of motor mounts configured to couple to a horizontal propulsion unit, wherein the first plurality of motor mounts are secured at the spar mounting locations;

a plurality of horizontal propulsion units, wherein each horizontal propulsion unit is attached to one of the first plurality of motor mounts;

a second plurality of motor mounts, each of the second plurality of motor mounts configured to couple to a vertical propulsion unit, wherein the second plurality of motor mounts are secured at the boom mounting locations of the boom carriers; and a plurality of vertical propulsion units, wherein each vertical propulsion unit is attached to one of the second plurality of motor mounts.

8. The UAV of claim 2, wherein the wing body includes ailerons at a trailing edge of the wing body, and wherein the ailerons are connected to the wing body through a flexible connection formed as a groove in a material of the wing body.

9. The UAV of claim 1, further comprising:

a clamp configured to clamp around the wing spar; and a fuselage body attached with the clamp for mounting the fuselage body to the wing spar, wherein the fuselage body is a modular fuselage body comprising:

a battery compartment;

an avionics compartment; and a delivery unit configured to handle a payload, wherein the battery compartment, the avionics compartment, and the delivery unit are detachable from each other and collectively form the fuselage body when secured together, wherein the delivery unit is disposed between the battery compartment and the avionics compartment when the fuselage body is assembled.

10. The UAV of claim 9, further comprising:

a plurality of printed circuit boards (PCBs) fastened to inside edges of the boom carriers, wherein the inside edges face the fuselage body, and wherein a side of the PCBs that faces the fuselage is at least partially exposed; and a plurality of electrical cables attaching the PCBs to the fuselage body.

11. The UAV of claim 1, wherein the wing spar is a carbon fiber tube with pre-drilled holes, and wherein the boom carriers are carbon fiber tubes with pre-drilled holes.

12. The UAV of claim 1, wherein half of the boom mounting locations along each of the boom carriers are disposed fore of the wing spar and half are disposed aft of the wing spar.

13. An Unmanned Autonomous Vehicle (UAV), comprising:

a structural frame formed by a wing spar secured to boom carriers, wherein the boom carriers are connected with boom clamps to the wing spar, and wherein each of the boom carriers includes a first boom mounting location for mounting a first vertical propulsion unit disposed fore of the wing spar and a second boom mounting location for mounting a second vertical propulsion unit disposed aft of the wing spar;

pre-formed boom shells each attached to a corresponding one of the boom carriers;

a fuselage body attached to the wing spar;

a plurality of printed circuit boards (PCBs) fastened to inside edges of the boom carriers and at least partially exposed while facing an opposing boom carrier and the fuselage body;

one or more electrical cables attaching the PCBs to the fuselage body; and a pre-formed wing shell attached to the structural frame, wherein the pre-formed wing shell includes a wing body having a first groove and two or more second grooves recessed into an underside of the wing body, wherein the first groove aligns with the wing spar and is shaped to mate with and accept the wing spar, wherein the second grooves align with the boom carriers and are shaped to mate with and accept the boom carriers, and wherein the first groove crosses the second grooves where the boom carriers are connected to the wing spar.

14. The UAV of claim 13, further comprising:

a spar clamp configured to clamp around the wing spar; and the fuselage body attached with the spar clamp for mounting the fuselage body to the wing spar, wherein the fuselage body is a modular fuselage body comprising:

a battery compartment;

an avionics compartment; and a delivery unit configured to handle a payload, wherein the battery compartment, the avionics compartment, and the delivery unit are detachable from each other and collectively form the fuselage body when secured together.

15. The UAV of claim 13, wherein sides of the PCBs that face the fuselage are at least partially exposed.

16. The UAV of claim 15, wherein the wing spar is a carbon fiber tube with pre-drilled holes configured to carry motor mounts of horizontal propulsion units, and wherein the boom carriers are carbon fiber tubes with pre-drilled holes configured to carry motor mounts for the first and second vertical propulsion units.

17. The UAV of claim 16, further comprising:
a plurality of horizontal propulsion units, wherein each horizontal propulsion unit is attached to a corresponding motor mount,
wherein the PCBs are electrically connected to the first and second vertical propulsion units and the horizontal propulsion units.

18. The UAV of claim 17, wherein the PCBs carry power converters and controllers.

19. The UAV of claim 16, wherein the boom carriers include a first boom carrier and a second boom carrier, the UAV further comprising:
a first rudder attached to the first boom carrier; and
a second rudder attached to the second boom carrier.

20. The UAV of claim 15, wherein the boom shell comprises a groove configured to mate with the boom carrier, and wherein the boom shell is adhered with the boom carrier without obstructing sides of the PCBs that face away from their boom carrier.

21. The UAV of claim 13, wherein the wing shell comprises:
a wing body;
an upper wing skin; and
a lower wing skin separate from the upper wing skin.

* * * * *